US006396877B1

(12) United States Patent
Hollenbach et al.

(10) Patent No.: US 6,396,877 B1
(45) Date of Patent: May 28, 2002

(54) METHOD AND APPARATUS FOR COMBINING SERIAL DATA WITH A CLOCK SIGNAL

(75) Inventors: Keith Eugene Hollenbach, Reading; Donald Raymond Laturell, Upper Macungie; Steven Brooke Witmer, Sinking Spring, all of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/013,943

(22) Filed: Jan. 27, 1998

(51) Int. Cl.[7] ............................................... H04B 14/06
(52) U.S. Cl. ...................................... 375/247; 375/295
(58) Field of Search ................................ 375/295, 360, 375/283, 247; 341/143

(56) References Cited

U.S. PATENT DOCUMENTS

| 3,573,770 | A | * | 4/1971 | Norris | 360/43 |
| 3,792,443 | A | * | 2/1974 | Breikss | 360/51 |
| 3,988,729 | A | * | 10/1976 | Herman | 341/68 |
| 4,052,558 | A | * | 10/1977 | Patterson | 375/283 |
| 4,218,770 | A | * | 8/1980 | Weller | 375/360 |
| 4,232,388 | A | * | 11/1980 | Isailovic | 375/360 |
| 5,701,106 | A | * | 12/1997 | Pikkarainen et al. | 332/100 |
| 5,745,063 | A | * | 4/1998 | Gruber et al. | 341/143 |
| 6,285,306 | B1 | * | 9/2001 | Zrilic | 341/143 |

OTHER PUBLICATIONS

Marvin E. Frerking; Digital Signal Processing in Communication Systems; Kluwer Academic Publishers; Boston/Dordrecht/London; 1994, pp. 96–98.*
Analog Devices et al., "Audio Codec '97; Component Specification; Revision 1.03; Sep. 15, 1996", Sep. 15, 1997.
Intel Corporation, "Audio Codec '97; Revision 2.0, Sep. 29, 1997".

* cited by examiner

Primary Examiner—Don N. Vo
(74) Attorney, Agent, or Firm—William H. Bollman

(57) ABSTRACT

The number of separate signals necessary in a serial interface are reduced by combining a transmit data signal with a clock signal having a rate equal to a multiple of a bit rate of the transmit data signal, before encoding for transmission. The number of separate signals in a serial interface may be reduced further by sigma-delta ($\Sigma/\Delta$) encoding the transmit data into 1-bit samples, thus eliminating the need for a frame sync signal. By combining the transmit data with a higher rate clock signal, jitter in the recovered clock signal at the receiving end is greatly reduced or even eliminated. At the receiving end, the higher speed clock is recovered at the multiplied rate, used to latch the transmit data from the combined data and higher clock signal, and divided back to the data rate to provide an original bit clock along with an original transmit data signal.

20 Claims, 7 Drawing Sheets

FRAMELESS INTERFACE

ENCODED CLOCK AND DATA INTERFACE

1/2 BIT RATE
BIT RATE

1/2 BIT RATE
BIT RATE

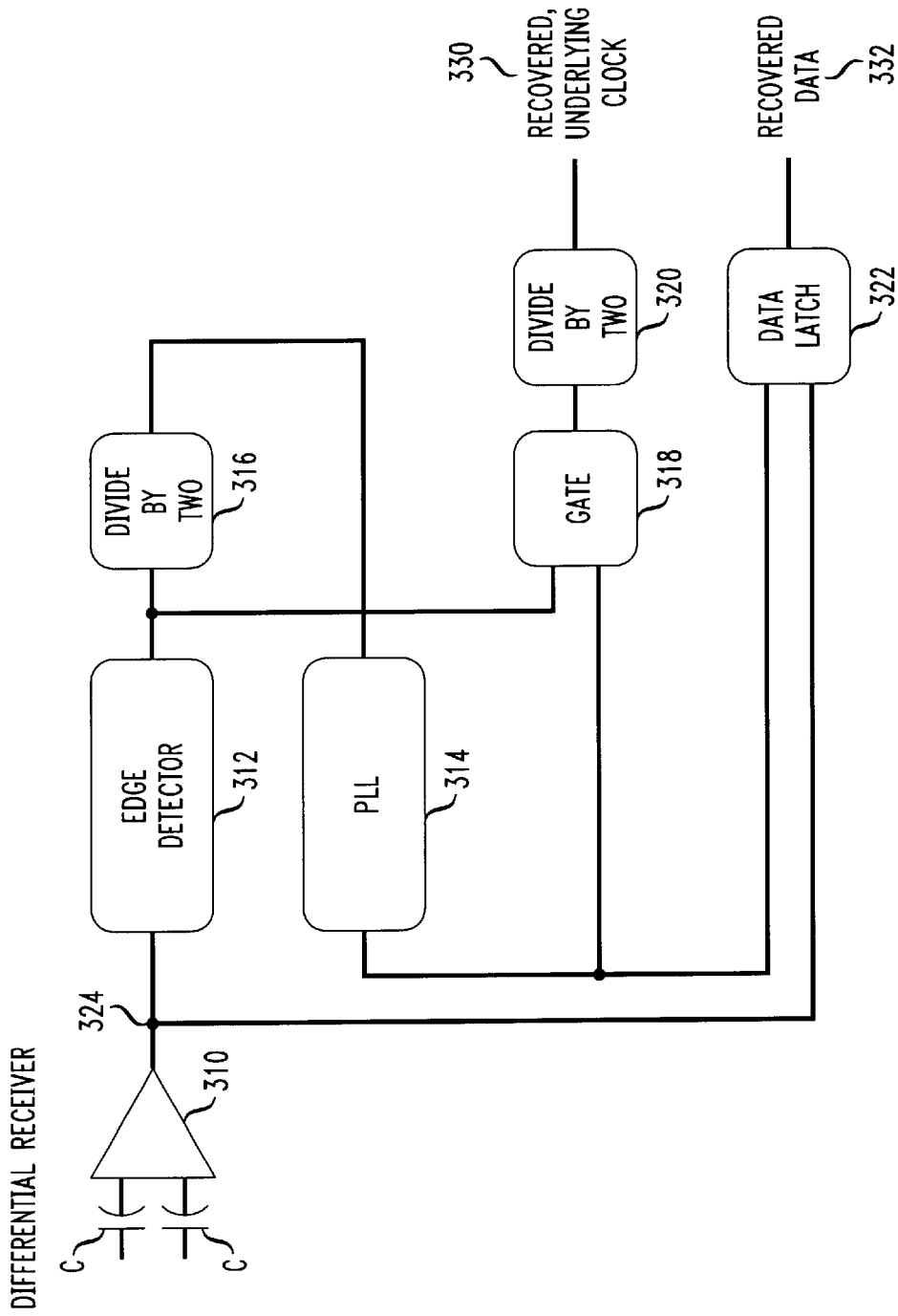

MULTIPROCESSOR INTERFACE

PRIOR ART

METHOD AND APPARATUS FOR COMBINING SERIAL DATA WITH A CLOCK SIGNAL

BACKGROUND OF THE INVENTION

1. Field of the Invention

This invention relates to an improved serial interface. More particularly, it relates to the consolidation of a four signal serial interface to as few as two differential signals by using sigma-delta encoded data and by combining transmit data with a clock having at least twice the speed as the bit rate of the transmit data.

2. Background of Related Art

FIG. 8 shows a conventional four signal, differential, serial interface between two separate circuits 700 and 702. One of the circuits is typically exposed to voltages in excess of the power voltage, and therefore is referred to herein as a high voltage circuit 702. In some situations it is desirable to AC couple a clock signal in a serial interface so that a codec or other high voltage circuit 702 may be electrically isolated from the ground of a low voltage circuit 700. It would similarly be desirable to AC couple the transmit data signal 716, the receive data signal 718, and the frame sync signal 712. If all signals between the low voltage circuit 700 and the high voltage circuit 702 are AC coupled, then there is essentially no need for a connection to exist between the ground of the low voltage circuit 700 and the ground of the high voltage circuit 702.

Unfortunately, in practical situations, once the grounds between the low voltage circuit 700 and high voltage circuit 702 are broken, a large common mode voltage may exist between the ground potential of the low voltage circuit 700 and the ground potential of the high voltage circuit 702. This large common mode voltage may interfere with the AC coupled digital signals in the isolated high voltage circuit 702.

To avoid this problem, differential AC coupled signaling is conventionally implemented to reject the common mode voltage. However, e.g., for four serial signals between the low voltage circuit 700 and the high voltage circuit 702, differential AC coupling would require eight high voltage capacitors: two for the clock signal 710, two for the transmit data signal 716, two for the receive data signal 718, and two for the frame sync signal 712 (with respect to the low voltage circuit 700). Unfortunately, eight high voltage isolation capacitors generally require an excessive amount of space and are cost prohibitive.

An example of a serial interface is the CSP1034 multi-processor mode SIO interface. Five serial signals are needed to complete this interface. Each of the five differential signal pairs would have to be isolated with a pair of capacitors for voltage isolation, but this would require ten high voltage capacitors at each end.

It is important to reduce the number of communication lines necessary to interface between circuits, particularly where one of the circuits is subject to higher voltages, e.g., a codec, because of the relative cost and circuitry of the individual lines. Moreover, it is important that with a consolidation of communication lines, consideration be given to ensure that the data clock can be recovered at the receiving end with minimal jitter.

SUMMARY OF THE INVENTION

In accordance with the principles of the present invention, serial streams are consolidated to reduce space and cost requirements. In one aspect, the invention provides a system for transmitting a single information signal combining a data signal with a clock signal corresponding to the bit rate of the data signal. The system comprises a transmit data signal, and a multiplied clock signal corresponding to at least twice the bit rate of the transmit data signal. A combined clock/data signal is formed consisting of a logical combination of the transmit data signal and the multiplied clock signal, and is transmitted to a separate circuit.

The receiver system comprises a receiver to receive the combined clock/data signal, and an edge detector to detect edges in the combined clock/data signal. A phase locked loop locks on a signal from the edge detector. A gate derives the clock signal from the combined clock/data signal, and a divider divides the derived clock signal to provide a recovered clock signal corresponding to the original bit rate of the original data signal. A latch driven by the phase locked loop derives the data signal from the combined clock/data signal.

BRIEF DESCRIPTION OF THE DRAWINGS

Features and advantages of the present invention will become apparent to those skilled in the art from the following description with reference to the drawings, in which:

FIG. 4 shows a schematic diagram of a circuit to recover clock and data from a single input signal, in accordance with the second embodiment of the present invention.

DETAILED DESCRIPTION OF ILLUSTRATIVE EMBODIMENTS

The present invention provides that the number of serial signals in a multiple-wire serial interface may be reduced by using a frame-less interface method, such as is provided by using 1-bit sigma-delta ($\Sigma/\Delta$) data. This eliminates the need for a frame sync signal since each sample is only 1 bit in length. Moreover, another aspect of the present invention combines transmit data together with a clock signal at least about two times the data rate to provide a low jitter recovered clock at the receiving end. This eliminates the need for a separate clock signal in the serial interface.

It is realized by the present inventors that conventional methods of combining a clock signal with transmit data cause significant amounts of jitter in the recovered clock signal at the receiver, particularly with high speed data. The present invention provides a technique which eliminates jitter otherwise introduced by combining the transmit data and clock signals by combining the transmit data with a multiplied clock, e.g., a clock having a speed of at least two times the data rate of the transmit data.

While the present invention is described with respect to differential serial lines, it is equally applicable to single-ended serial lines. Moreover, while the present invention is shown and described with respect to the combined clock signal being at least about twice the data rate, the principles of the present invention are equally applicable to the combination of a higher speed clock signal having a speed equal to any real number multiple greater than about two.

Figure 1:
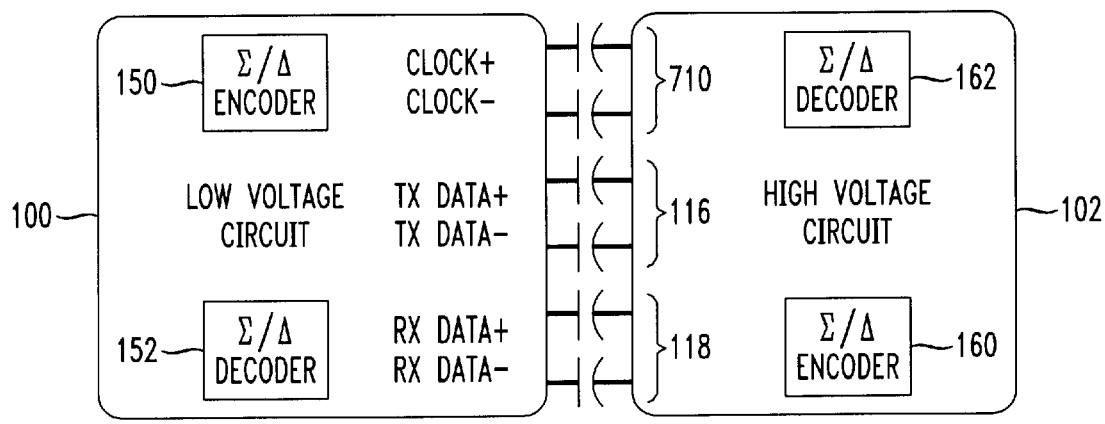
FIG. 1 shows a consolidation of four serial signals between a low voltage circuit and a high voltage circuit into three serial signals in accordance with a first embodiment of the present invention.
Figure 8:
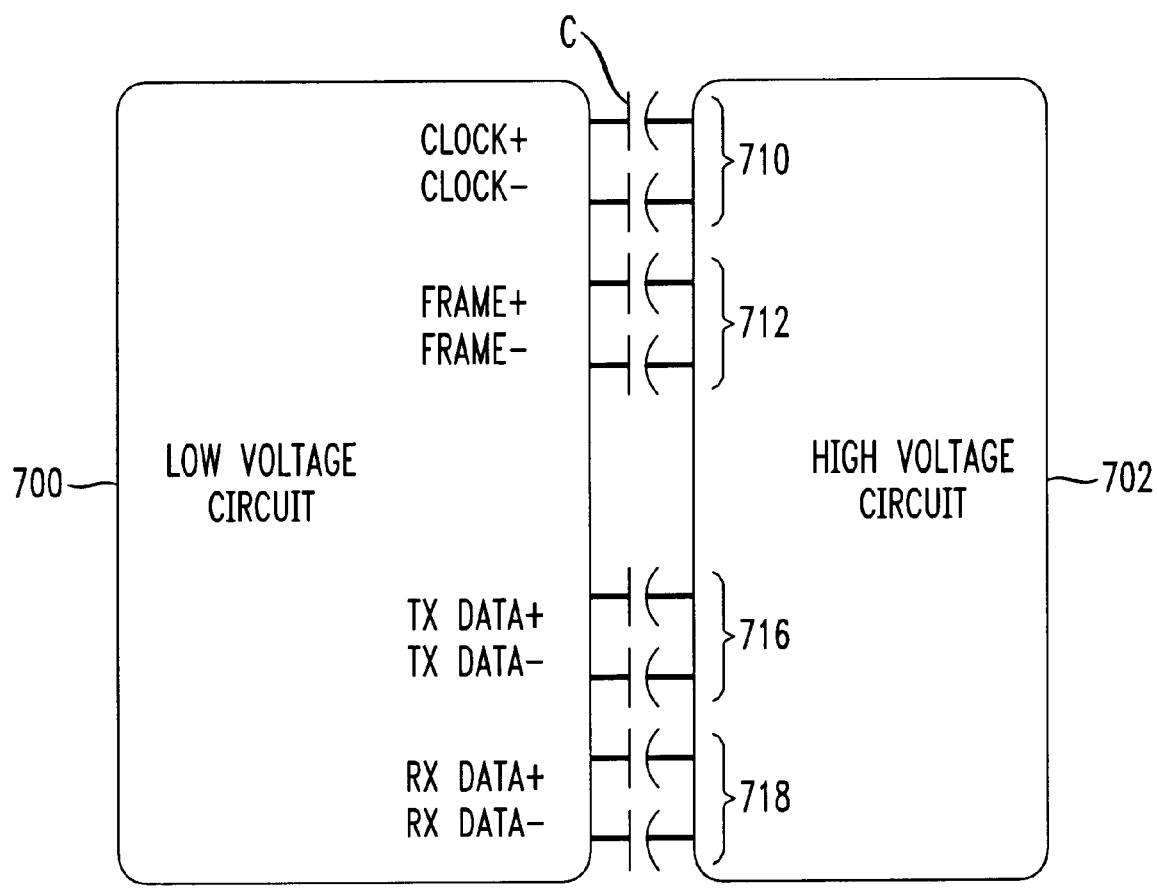
FIG. 8 shows a conventional four signal, differential, serial interface between two separate circuits.

FIG. 1 shows a first embodiment of the present invention wherein the number of serial signals between a low voltage circuit 100 and a high voltage circuit 102 (e.g., a codec) are reduced from four (as shown in FIG. 8) to three by using 1-bit Σ/Δ encoded data. Sigma-delta (Σ/Δ) conversion techniques, including interpolation and decimation, are well known.

The transmit data and receive data streams (from the perspective of the low voltage circuit 100) are Σ/Δ encoded and decoded respectively with 1-bit data samples. Because the data samples are only one bit in length, the samples are always read properly. Thus, in FIG. 1, the frame sync signal required for the conventional interface shown in FIG. 8 is eliminated by using a Σ/Δ transmit data stream 116.

In particular, in the disclosed embodiment the low voltage circuit 100 includes a Σ/Δ encoder 150 to encode binary transmit data into 1-bit per sample Σ/Δ transmit data stream 116, and a Σ/Δ decoder or decimator 152 to decode Σ/Δ receive data into binary received data, e.g., 20-bit data samples. Similarly, the high voltage circuit 102 includes a Σ/Δ encoder 160 to encode the Σ/Δ receive data stream 118, and a Σ/Δ decoder 162 to decode Σ/Δ transmit data stream 116 into binary transmit data. Within the Σ/Δ encoders 150, 160, digital-to-analog (D/A) data is placed on the lines between the low voltage circuit 100 and the high voltage circuit 102 after final interpolation and processing by a digital Σ/Δ encoder, which is also referred to as a digital-to-digital (D/D) circuit. The A/D converter data within the Σ/Δ decoders 152, 162 is placed on the lines between the low voltage circuit 100 and the high voltage circuit 102 before any decimation filtering takes place. Sigma-delta is sometimes referred to as Delta-sigma (Δ/Σ) by those of skill in the art.

Figure 2:
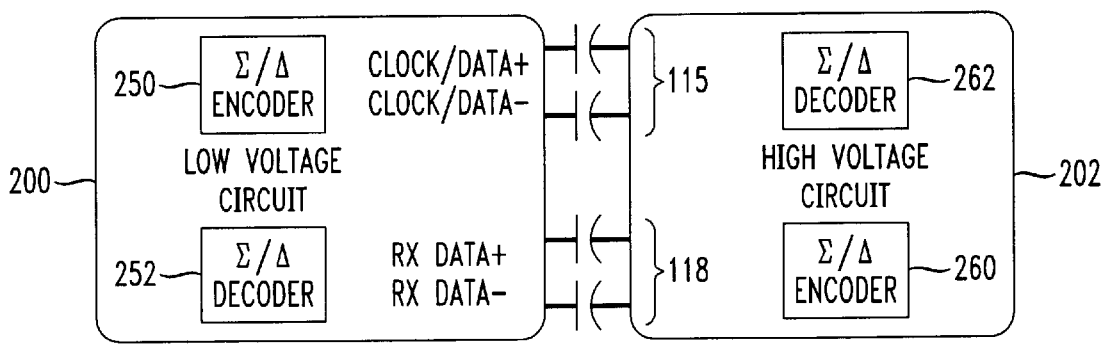
FIG. 2 shows a consolidation of four serial signals between a low voltage circuit and a high voltage circuit into two serial signals in accordance with a second embodiment of the present invention.

FIG. 2 shows another embodiment of the present invention wherein the conventional four line serial interface as shown in FIG. 8 is consolidated into only two serial data streams: a receive data stream 118 and a combined clock/transmit data stream 115. The receive data stream 118 is a 1-bit per sample Σ/Δ data stream, requiring a Σ/Δ encoder 260 in the high voltage circuit 202 and a Σ/Δ decoder 252 in the low voltage circuit 200. The transmit data signal requires a Σ/Δ encoder 250 in the low voltage circuit 200 and a Σ/Δ decoder 262 in the high voltage circuit 202.

According to this embodiment, the transmit and receive data streams are Σ/Δ encoded for transmission. This method is advantageous to eliminate the requirement for an additional framing signal since each sample is one bit in length at the data rate. Thus, the recovered clock signal at the receiver essentially provides both the data clock as well as the framing signal.

The transmit data signal is Σ/Δ encoded and combined with a higher speed clock signal, then Manchester encoded to result in the clock/transmit data signal 115 shown in FIG. 2. This second embodiment reduces the required number of differential lines in the serial interface from four to two, and correspondingly reduces the number of high voltage isolation circuits or capacitors from eight to four.

Preferably, the transmit data signal is combined with a multiple of a clock signal representing at least about two times the data rate of the transmit data signal. It is found by the present inventors that combination of the higher speed clock with the transmit data, e.g., before Manchester encoding, greatly reduces resultant jitter caused generally by a phase locked loop (PLL) in a clock recovery circuit in the receiver. The transmit data combined with a higher speed clock component is shown in FIG. 2 as the clock/transmit data signal 115.

Jitter is random variation in the timing of a signal, especially a clock signal. The combination of a transmit data signal with a clock signal as in conventional systems utilizing Manchester encoding alone causes jitter in the reception of the clock signal, e.g., at the high voltage circuit 202. If the clock recovery system in the high voltage circuit 202 does not eliminate the jitter, the signal-to-noise (S/N) performance of the high voltage circuit will be degraded. Therefore, this jitter must be removed.

An ordinary Manchester encoded data transmission would ordinarily tolerate jitter, but a clock jitter value of the amount involved during the combination of transmit data with a conventional rate data clock directly degrades the signal-to-noise performance of the receiving circuit, e.g., the high voltage circuit 202, particularly if the receiving circuit is a codec. The present invention provides apparatus and a method to recover the original clock signal at the receiving end, e.g., at the high voltage circuit 202, free of the jitter which would otherwise be caused during a combination of a transmit data signal with a bit rate clock.

One conventional solution to the jitter problem is to use a phase locked loop (PLL) in a receiver circuit, and to use the output of a voltage controlled oscillator (VCO) in the PLL to replace the jittery clock signal. A PLL is conventionally utilized to improve the recovered clock, but a low power VCO itself causes jitter due to noise.

The most suitable method of encoding a data stream for transmission together with clock information is bi-phase or Manchester encoding. Manchester encoding is one method of encoding a clock signal with transmit data to better enable the receiver to synchronize with the sender. Without Manchester encoding, the possibility exists for the transmission of extended periods of continuous "1"s or "0"s. However, when several identical bits are sent in succession, there are no changes in the signal, thus providing no clock information to the receiver about when each bit starts and stops. Manchester encoding prevents this by splitting each bit period into two, and ensuring that there is always a transition of signal levels in the middle of each bit. Thus, because each bit is guaranteed to cause a transition in the transmission line, the receiver is better able to synchronize with the sender by recovering the clock signal from the transmitted data.

Another method of encoding a transmit data stream with clock information is by Differential Manchester encoding. In normal Manchester encoding, a "1" bit is transmitted with a high voltage in the first half of the split period, and a low voltage in the second half of the split period, and vice versa for the "0" bit. In Differential Manchester encoding, a "1" bit is indicated by making the first half of the next bit signal equal to the last half of the previous bit's signal, and a "0"

bit is indicated by making the first half of the next bit signal opposite to the last half of the previous bit's signal. That is, a "0" bit is indicated by a transition at the beginning of the bit. Like normal Manchester encoding, Differential Manchester encoding provides that there is always a transition in the middle of the transmitted bit signal.

Figure 3A:
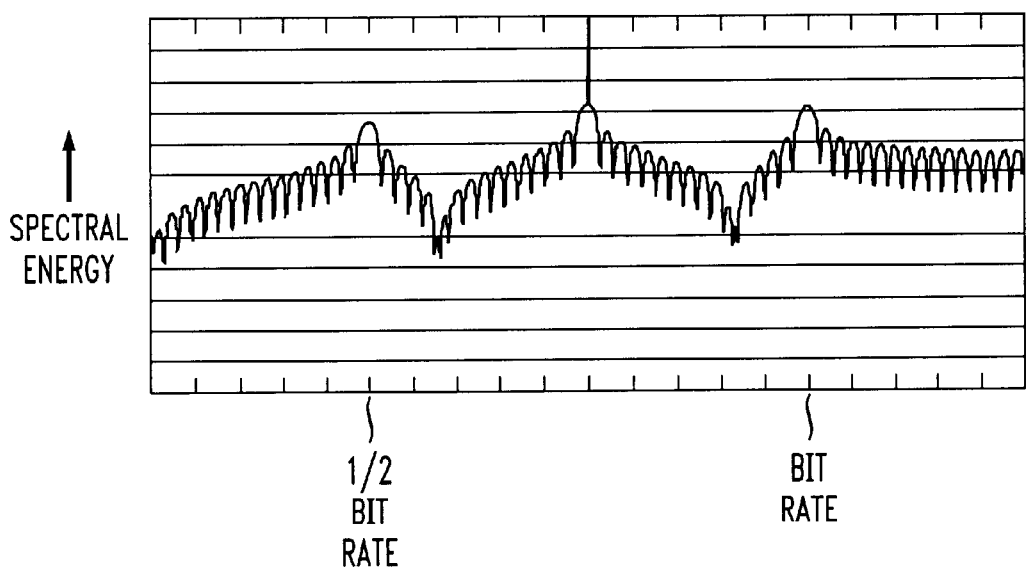
FIG. 3A is a simulated spectral graph showing the spectral energy of 128 "1"s transmitted in the midst of an idle pattern of "01010101" produced by a conventional serial interface device.

However, even with Manchester or Differential Manchester encoding, transmitted data may cause errors in the recovered clock. For instance, FIG. 3A shows a simulated spectral plot of energy of an idle pattern of "0101010101" (with respect to a clock at the data rate) with a burst of 128 "1"s in the middle. A dominant peak is seen at the bit rate, which is the point which is locked on to by a PLL in a receiver circuit. The peak at ½ the bit rate is sufficiently distant from the bit rate peak to provide little danger of the PLL locking on to the ½ bit rate frequency. However, FIG. 3A also shows an even more dominant peak at about ¾ the bit rate. The significant amount of spectral energy at a frequency other than the desired bit rate frequency can cause the PLL in the receiver to jitter by attempting to lock onto the ¾ bit rate frequency.

Figure 3B:
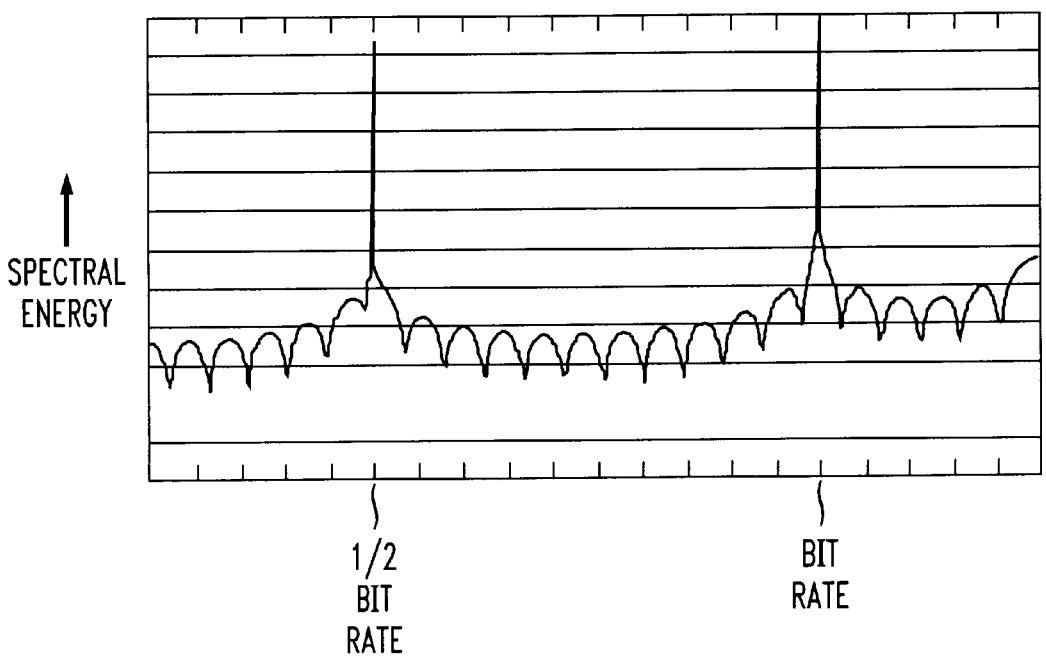
FIG. 3B is a simulated spectral graph showing the spectral energy of 128 "1"s transmitted in the midst of an idle pattern of "00110011" produced by a serial interface in accordance with the present invention.

A similar simulation is shown in FIG. 3B, but for the inventive combination of transmit data with a higher speed clock of two times the bit rate. FIG. 3B shows the spectral energy with respect to frequency of an idle pattern of "00110011" (with respect to a clock at two times the data rate) with a burst of 128 "1"s in the middle. FIG. 3B shows dominant spectral energy at the desired bit rate frequency, and also at the ½ bit rate frequency. However, importantly, FIG. 3B shows clearly that no significant spectral energy is present between the full bit rate frequency and the ½ bit rate frequency. This absence of distracting spectral energy allows a PLL or other synchronizing circuitry in the receiver to lock onto the proper frequency, and thus recover the clock essentially free of jitter.

While combination of the transmit data with a clock having a speed less than two but greater than one times the data rate is possible, it is found that jitter is more preferably reduced when the multiple of the clock for combination is at least about two.

The combination of the higher speed data clock signal with the transmit data may be performed by a combiner comprising simple logic, e.g., an exclusive OR (XOR) logic gate, or similar function within a processor. The combined higher speed clock and Σ/Δ encoded transmit data are then Manchester encoded and transmitted, e.g., by a differential transmitter.

Thus, the present invention eliminates jitter in the recovered clock signal by combining the transmit data with a clock having at least about twice the speed as the transmit data, before encoding. This ensures that there is sufficient energy in the recovered clock spectral component at the underlying original clock frequency to be recovered properly at a receiving end. The use of a higher speed clock ensures that there will always be redundant data transitions in the encoded data transmission for use to recover the original clock events, free of jitter. Thus, by combining the transmit data with a multiplied clock before Manchester encoding, the present invention ensures that enough transitions and therefore enough energy is provided with respect to the multiplied clock component.

As long as a PLL in the receiver is able to lock in quadrature to the multiplied clock component of the combined clock and transmit data signal 115, the VCO of the PLL will be able to aid in recovery of the underlying, original 1× clock component using a divide function, e.g., divide by two. In the case of a divide by two, a gated flip/flop (F/F) forms a suitable divide function. In this case, the non-inverted VCO output is applied to the gated F/F and the inverted VCO output is used to recover data.

FIG. 4 shows a clock and data recovery circuit to recover and separate the transmit data signal and the clock signal at the high voltage circuit 202.

In FIG. 4, the combined transmit data/clock signal is AC coupled to a differential receiver 310 through capacitors C. The differential receiver 310 converts the differential, serial, combined transmit and clock signal into a single ended received transmittdata signal at point 324. The received transmit/data signal 324 is input to an edge detector circuit 312. The detected edges are halved by a divide by two circuit 316, and locked in quadrature by a phase locked loop 314. The output of the PLL 314 gates the detected edges at gate 318 to provide a multiplied clock (e.g., multiplied by two), which is divided by the multiple (e.g., two) at 320 and provided to the high voltage circuit as the recovered, underlying, original clock signal 330. The output of the PLL 314 also latches the single-ended received transmitted data at data latch 322 to provide the recovered data 332.

A timing diagram analysis of FIG. 4 illustrates the combination of a multiplied clock (e.g., multiplied by two) with transmit data, and the recovery of the same, in accordance with the principles of the present invention.

Figure 5:
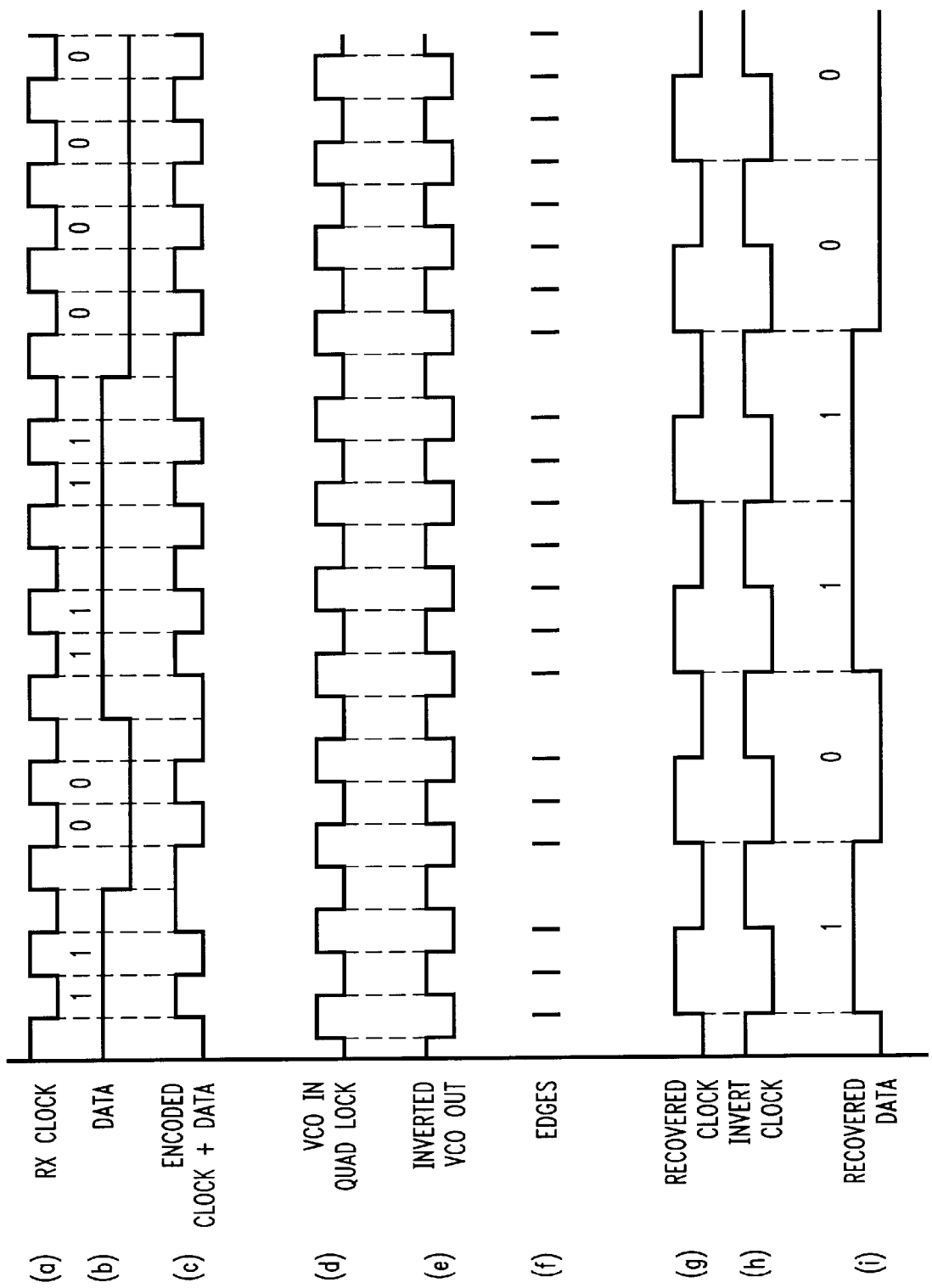
FIG. 5 is a timing diagram of the schematic diagram shown in FIG. 4.

Observing low voltage circuit 200 of FIG. 2, waveform (a) of FIG. 5 shows the clock multiplied by two with respect to the 1× transmit data signal shown in waveform (b). An exclusive OR (XOR) of the multiplied clock signal with the transmit data signal results in waveform (c) shown in FIG. 5.

At the receiving end, i.e., in the high voltage circuit 202 of FIG. 2, the voltage controlled oscillator VCO output locks onto the multiplied clock component in the combined clock/transmit data signal as shown in waveform (d) of FIG. 5. An inversion of the VCO output is depicted in waveform (e), and the detected edges in the received, combined clock/transmit data signal are shown in waveform (f). The detected edges (waveform (f)) gate the VCO output to result in the recovered original, underlying clock as shown in waveform (g). An inversion of the recovered original, underlying clock is shown in waveform (h). A falling edge of the inverted clock shown in waveform (h) latches the received combined clock/transmit data combined signal (waveform (c)), resulting in the recovered data shown in waveform (i) of FIG. 5. The waveforms in FIG. 5 show that the PLL re-times the clock event, but that the output of the PLL 314 is not directly used to drive the high voltage circuit 202.

Figure 6:
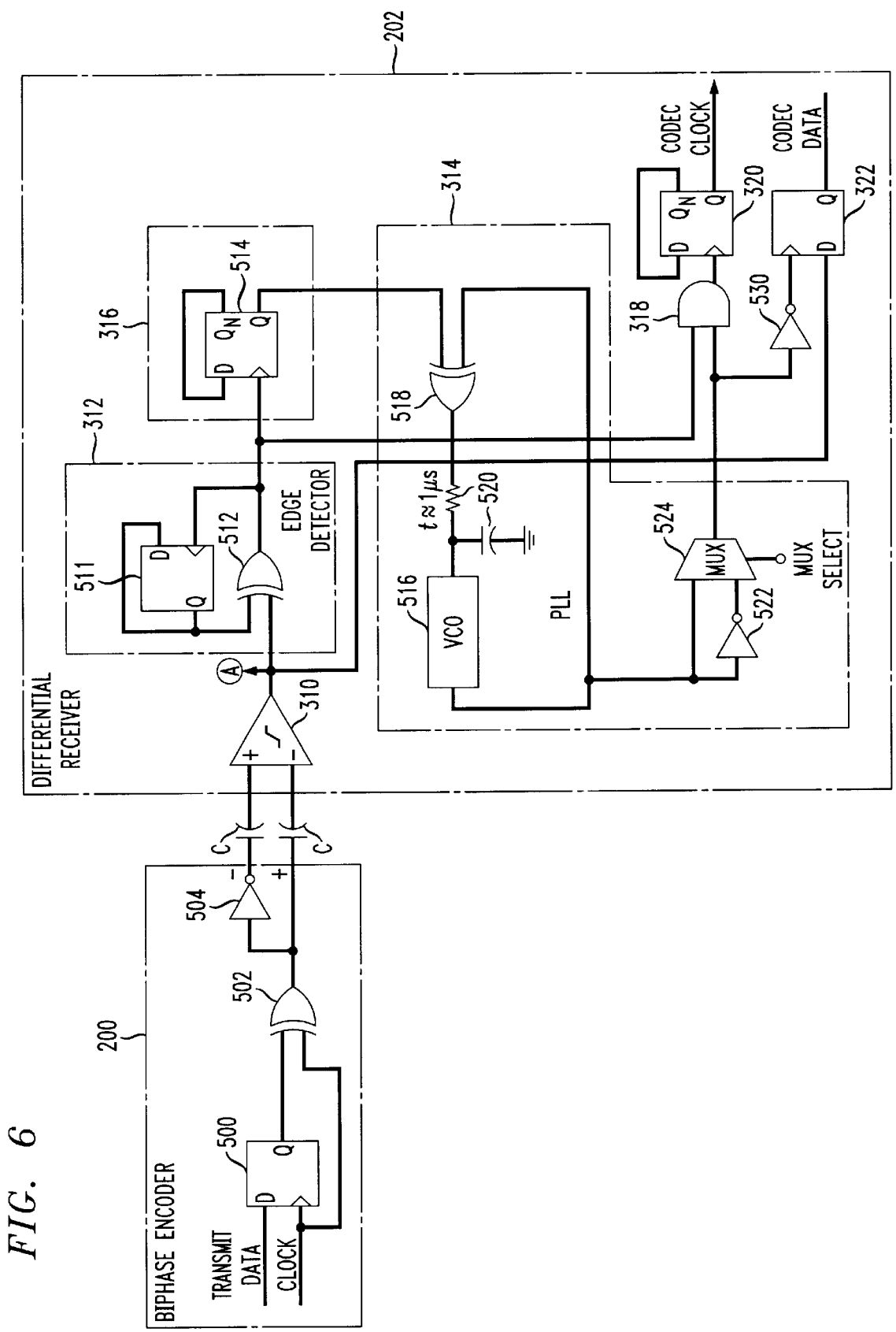
FIG. 6 is one implementation of the schematic diagram shown in FIG. 4.
Figure 7:
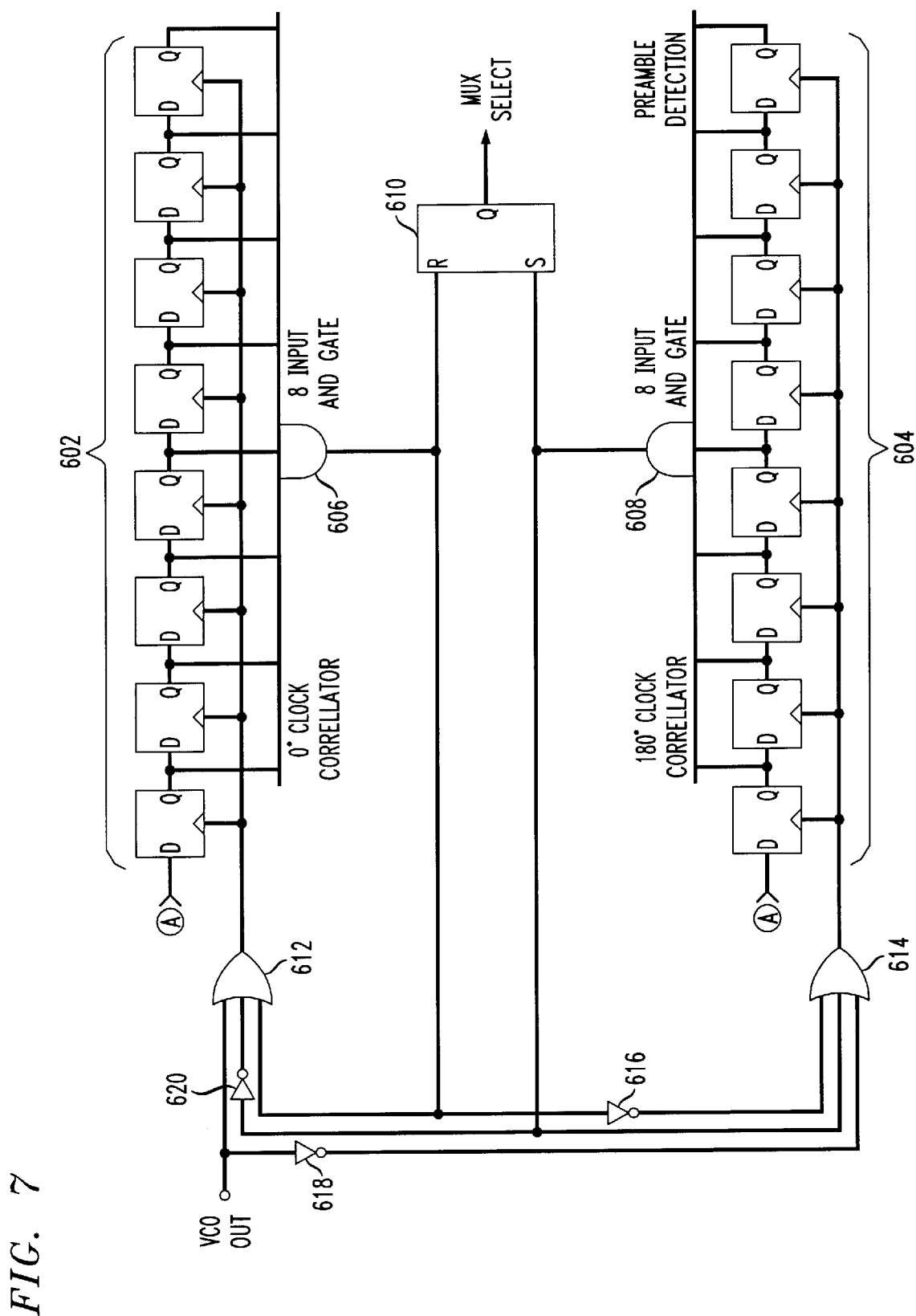
FIG. 7 is a further implementation of the schematic diagram shown in FIG. 4.

One possible circuit to implement the schematic diagram of FIG. 4 is shown in FIGS. 6 and 7. FIG. 6 shows the relevant portions of the low and high voltage circuits 200, 202 for the purposes of explaining the combination of the multiplied clock signal with the transmit data signal in the low voltage circuit 200, and the recovery and separation of the same in the high voltage circuit 202.

In FIG. 6, the Σ/Δ encoded transmit data signal is input to the D input of a flip/flop (F/F) 500, which is clocked by the multiplied clock signal. The Q output of the F/F 500 is exclusive ORed (XOR) with the multiplied clock signal at XOR 502, and differentially transmitted to the high voltage circuit 202 via AC coupling capacitors C. A differential receiver 310 converts the differential signal back to a single-ended signal at point A.

The edge detector circuit is comprised of XOR 512 and F/F 511. The divide by two 316 is comprised of F/F 514. The gate 318 in FIG. 4 is configured as an AND gate, and the divide by two 320 is configured as a F/F. Data latch 322 is also a F/F. The PLL 314 is comprised of XOR 518, a filter 520, and a voltage controlled oscillator 516. The filter 520 comprises an RC circuit including a resistor and a capacitor having a time constant, e.g., of about 1 microsecond ($\mu$S). The time constant of filter 520 is slow enough to provide a filter function yet fast enough not to cause a significant delay.

The XOR 518 provides the feedback necessary to form the closed phase locked loop. The filter 520 is necessary to ensure a minimum offset in time between the edges of the VCO output clock signal (shown in waveform (d) of FIG. 5) and the edges of the original multiplied clock (shown in waveform (a) of FIG. 5). Multiplexer (MUX) 524 outputs either the VCO output (shown in waveform (d) of FIG. 5) or an inversion of the VCO output (shown in waveform (e) of FIG. 5), depending upon the control signal MUX SELECT.

FIG. 7 shows a circuit for providing the control signal MUX SELECT. In FIG. 7, the received, combined clock/transmit data signal at point A in FIG. 6 is input to two separate serially connected groups of eight F/Fs 604 and 606, which detect a preamble. The circuits shown in FIG. 7 resolve 180 degree ambiguity of the clock so that correct separation of clock and data occurs.

While the invention has been described with reference to the exemplary preferred embodiments thereof, those skilled in the art will be able to make various modifications to the described embodiments of the invention without departing from the true spirit and scope of the invention.

We claim:

1. A system to transmit a combined sigma-delta encoded data and clock signal, said system comprising:
    a combiner adapted to combine a sigma-delta encoded transmit data signal with a clock signal having a clock rate equal to at least about twice a bit rate of said transmit data signal to form a combined data and clock signal; and
    a transmitter to transmit said combined data and clock signal as a single serial information stream.

2. A system to transmit a combined sigma-delta encoded data and clock signal in accordance with claim 1, further comprising:
    an encoder, between said combiner and said transmitter, adapted and arranged to encode said combined sigma-delta encoded data and clock signal for transmission.

3. The system to transmit a combined sigma-delta encoded data and clock signal in accordance with claim 1, wherein:
    said combiner comprises an exclusive OR.

4. The system to transmit a combined sigma-delta encoded data and clock signal in accordance with claim 2, wherein:
    said encoder is a Manchester encoder.

5. The system to transmit a combined sigma-delta encoded data and clock signal in accordance with claim 2, wherein:
    said encoder is a Differential-Manchester encoder.

6. A system to receive a combined sigma-delta encoded data and clock signal, said system comprising:
    a receiver adapted to receive said combined sigma-delta encoded data and clock signal;
    an edge detector adapted to detect clock edges in said combined sigma-delta encoded data and clock signal;
    a phase locked loop adapted to phase lock on said detected clock edges in said combined sigma-delta encoded data and clock signal;
    a first extractor adapted to extract a clock signal having a clock rate equal to at least about twice a bit rate of a transmit sigma-delta encoded data signal from said combined sigma-delta encoded data and clock signal to form an extracted clock signal;
    a divider adapted to divide said extracted clock signal to provide a recovered clock signal corresponding to a bit rate of said transmit data signal; and
    a second extractor adapted to extract said transmit sigma-delta encoded data signal from said combined sigma-delta encoded data and clock signal.

7. The system to receive a combined sigma-delta encoded data and clock signal in accordance with claim 6, wherein:
    said divider divides by at least about two.

8. The system to receive a combined sigma-delta encoded data and clock signal in accordance with claim 6, wherein:
    said phase locked loop is adapted to lock onto a frequency which is substantially equal to said bit rate of said transmit sigma-delta encoded data signal.

9. A method of transmitting a combined sigma-delta encoded data and clock signal together in a single serial information stream, said method comprising:
    providing a higher speed clock signal having a clock rate equal to at least about two times a bit rate of a transmit data signal;
    combining said higher speed clock signal with a transmit sigma-delta encoded data signal to form said combined sigma-delta encoded data and clock signal; and
    transmitting said combined sigma-delta encoded data and clock signal as a single serial information stream.

10. The method of transmitting according to claim 9, wherein said step of combining further comprises:
    logically exclusive ORing said clock signal with said transmit sigma-delta encoded data signal.

11. The method of transmitting according to claim 9, wherein:
    encoding said combined sigma-delta encoded data and clock signal comprises Manchester encoding.

12. The method of transmitting according to claim 9, wherein:
    encoding said combined sigma-delta encoded data and clock signal comprises Differential-Manchester encoding.

13. A method of receiving a combined sigma-delta encoded data and clock signal from a single serial information stream, said method comprising:
    receiving said single serial information signal comprising said combined sigma-delta encoded data and clock signal;
    detecting clock edges in said combined sigma-delta encoded data and clock signal;
    locking a phase locked loop on said detected clock edges;
    extracting a clock signal having a clock rate equal to at least about twice a bit rate of a transmit sigma-delta encoded data signal from said combined sigma-delta encoded data and clock signal to form an extracted clock signal;
    dividing said extracted clock signal to provide a recovered clock signal corresponding to a bit rate of said transmit sigma-delta encoded data signal; and
    extracting said transmit sigma-delta encoded data signal from said combined sigma-delta encoded data and clock signal.

14. The method of receiving a combined sigma-delta encoded data and clock signal in accordance with claim 13, wherein:

said dividing divides by at least about two.

15. The system of receiving a combined sigma-delta encoded data and clock signal in accordance with claim 13, wherein said step of locking said phase locked loop further comprises:

locking said phase locked loop on a frequency substantially equal to said bit rate of said transmit sigma-delta encoded data signal.

16. Apparatus to receive a combined sigma-delta encoded data and clock signal from a single serial information stream, said apparatus comprising:

means for receiving said single serial information signal comprising said combined sigma-delta encoded data and clock signal;

means for detecting clock edges in said combined sigma-delta encoded data and clock signal;

means for locking a phase locked loop on said detected clock edges;

means for extracting a clock signal having a clock rate equal to about two times a bit rate of a sigma-delta encoded data signal from said combined sigma-delta encoded data and clock signal to form an extracted clock signal;

means for dividing said extracted clock signal to provide a recovered clock signal corresponding to a bit rate of said sigma-delta encoded data signal; and means for extracting said sigma-delta encoded data signal from said combined sigma-delta encoded data and clock signal.

17. Apparatus to transmit a combined sigma-delta encoded data and clock signal together in a single serial information stream, said apparatus comprising:

means for providing a clock signal having a clock rate equal to about two times a bit rate of a sigma-delta encoded data signal;

means for combining said clock signal with said sigma-delta encoded data signal to form said combined sigma-delta encoded data and clock signal; and means for transmitting said combined sigma-delta encoded data and clock signal as a single serial information stream.

18. The apparatus of claim 17, further comprising:

means for encoding said combined sigma-delta encoded data and clock signal.

19. The apparatus of claim 18, wherein:

said means for encoding is a Manchester encoder.

20. The apparatus of claim 18, wherein:

said means for encoding is a Differential-Manchester encoder.

* * * * *